United States Patent
Daugherty et al.

(10) Patent No.: US 7,224,786 B2
(45) Date of Patent: May 29, 2007

(54) SYSTEM AND METHOD FOR DETECTING UNAUTHORIZED ACCESS USING A VOICE SIGNATURE

(75) Inventors: Joel D. Daugherty, Richmond, VA (US); William D. Hornsby, Richmond, VA (US)

(73) Assignee: Capital One Financial Corporation, McLean, VA (US)

( * ) Notice: Subject to any disclaimer, the term of this patent is extended or adjusted under 35 U.S.C. 154(b) by 137 days.

(21) Appl. No.: 10/659,899

(22) Filed: Sep. 11, 2003

(65) Prior Publication Data

US 2005/0060157 A1    Mar. 17, 2005

(51) Int. Cl.
*H04M 17/00* (2006.01)
(52) U.S. Cl. ............. 379/145; 379/114.14; 379/88.19; 704/273
(58) Field of Classification Search ................ 379/145, 379/201.01, 88.19, 114.14; 704/273, 246
See application file for complete search history.

(56) References Cited

U.S. PATENT DOCUMENTS

| 6,141,644 | A | * | 10/2000 | Kuhn et al. .................. 704/273 |
| 2002/0152078 | A1 | * | 10/2002 | Yuschik et al. ............. 704/273 |
| 2003/0174823 | A1 | * | 9/2003 | Justice et al. ............... 379/145 |
| 2004/0240631 | A1 | * | 12/2004 | Broman et al. .......... 379/88.02 |
| 2005/0225430 | A1 | * | 10/2005 | Seifert ........................ 340/5.53 |

* cited by examiner

*Primary Examiner*—Fan Tsang
*Assistant Examiner*—Olisa Anwah
(74) *Attorney, Agent, or Firm*—Hunton & Williams LLP

(57) ABSTRACT

A method for detecting unauthorized access is provided. The method includes receiving a voice input associated with a request to access an account. A request voice signature corresponding to the voice input associated with the request is generated. An authorized voice signature corresponding to the account is retrieved. The request voice signature corresponding to the voice input is compared with the authorized voice signature corresponding to the account. Unauthorized access is detected in response to the comparison.

13 Claims, 5 Drawing Sheets

SYSTEM AND METHOD FOR DETECTING UNAUTHORIZED ACCESS USING A VOICE SIGNATURE

TECHNICAL FIELD OF THE INVENTION

This invention relates in general to account access systems and more particularly to a system and method for detecting unauthorized access using a voice signature.

BACKGROUND OF THE INVENTION

A financial institution such as a bank may provide accounts such as credit accounts to customers. The financial institution may allow customers to access account information through a voice response unit. For example, a customer may request access to account information through the voice response unit. In return, the voice response unit may generate messages that provide the account information.

SUMMARY OF THE INVENTION

In accordance with the present invention, systems and methods for detecting unauthorized access using a voice signature are provided. In general, an institution such as a financial institution may offer an account to a customer. The institution may allow the customer to access the account through a telephony access unit that has access to an authorized voice signature corresponding to the customer. The telephony access unit may receive a voice input from a caller requesting access to the account, and generate a request voice signature corresponding to the voice input. The request voice signature may be compared with the authorized voice signature. The telephony access unit may detect unauthorized access if the request voice signature does not match the authorized voice signature. In some embodiment, if the request voice signature does not match the authorized voice signature, the caller may be denied access to the account. In particular embodiments, if the request voice signature does not match the authorized voice signature, the request voice signature may be added to a fraudulent voice signature file. The fraudulent voice signature file may be used to identify users who have attempted to gain unauthorized access.

According to one embodiment, a method for detecting unauthorized access using a voice signature is provided. The method includes receiving a voice input associated with a request to access an account. A request voice signature corresponding to the voice input associated with the request is generated. An authorized voice signature corresponding to the account is retrieved. The request voice signature corresponding to the voice input is compared with the authorized voice signature corresponding to the account. Unauthorized access is detected in response to the comparison.

Various embodiments of the present invention may benefit from numerous advantages. It should be noted that one or more embodiments may benefit from some, none, or all of the advantages discussed below.

One advantage of the invention may be that a telephony access unit may compare voice input from a caller with an authorized voice signature to determine whether the voice input belongs to an authorized user of an account. Thus, the telephony access unit may detect if unauthorized users attempt to access the account.

Another advantage may be that the telephony access unit may generate a fraudulent voice signature file that includes voice signatures of users who attempt to gain unauthorized access to accounts. The file may be used to check whether a caller has ever attempted to gain unauthorized access. In addition, the file may be compared with a set of recorded voice signatures in order to identify voice signatures that are associated with unauthorized access.

Other technical advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Example embodiments of the present invention and their advantages are best understood by referring now to FIGS. 1 through 7 of the drawings, in which like numerals refer to like parts.

In general, an institution such as a financial institution may offer an account to a customer. The institution may allow the customer to access the account through a telephony access unit that has access to an authorized voice signature corresponding to the customer. The telephony access unit may receive a voice input from a caller requesting access to the account, and generate a request voice signature corresponding to the voice input. The request voice signature may be compared with the authorized voice signature. The telephony access unit may detect unauthorized access if the request voice signature does not match the authorized voice signature. In some embodiment, if the request voice signature does not match the authorized voice signature, the caller may be denied access to the account. In particular embodiments, if the request voice signature does not match the authorized voice signature, the request voice signature may be added to a fraudulent voice signature file. The fraudulent voice signature file may be used to identify users who have attempted to gain unauthorized access.

Figure 1:
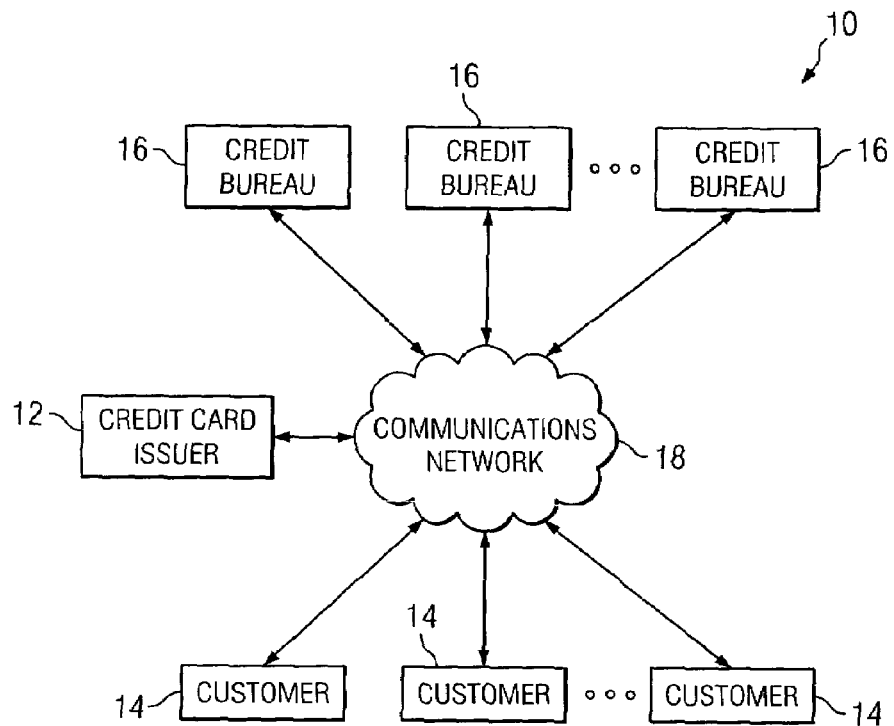
FIG. 1 illustrates an example system for handling credit accounts.

FIG. 1 illustrates an example system 10 for handling credit accounts. System 10 may include a credit card issuer 12, one or more customers 14, and one or more credit bureaus 16, which may be coupled to each other by a communications network 18. Credit card issuer 12 and customers 14 may communicate with each other using communications network 18 to transfer credit account information. For example, a customer 14 may contact credit card issuer 12 using communications network 18 to open a credit account, make inquiries or requests regarding a credit account, make payments to credit card issuer 12, or close a credit account. Credit card issuer 12 may similarly contact customer 14 to offer a credit account to customer 14, make inquiries regarding recent charges posted to a credit account, or remind customer 14 of payments that are due. Credit card issuer 12 may communicate with credit bureau 16 using communications network 18 to obtain credit information regarding customers 14.

A customer 14, or cardholder 14, may comprise an individual, a group of individuals, a business organization, or any other suitable entity to which credit card issuer 12 may issue one or more credit accounts and provide one or more lines of credit. A credit bureau 16 may provide credit information regarding customers 14 to credit card issuer 12. Credit information may include credit history information, payment information, personal information regarding occupation, income, home ownership, any other suitable information, or any combination of the preceding. As an example only and not by way of limitation, a credit bureau 16 may comprise TRANS UNION, EQUIFAX, EXPERIAN, or any other suitable credit bureau. Communications network 18 may, in particular embodiments, comprise some or all of a public switched telephone network (PSTN), a public or private data network, the Internet, a wireline or wireless network, a local, regional, or global communications network, an enterprise intranet, other suitable communication link, or any combination of the preceding.

Credit card issuer 12 may include any entity suitable to provide customer 14 a credit account. A credit account allows a customer to make purchases on credit rather than using cash. Customers incur debt with each credit card purchase, which may be repaid over time according to the terms and conditions of the particular customer's credit account. As an example only and not by way of limitation, credit card issuer 12 may in particular embodiments include a merchant, a bank, a credit union, or other commercial or financial institution. Credit card issuer 12 may issue any suitable credit card for a credit account. As an example and not by way of limitation, credit card issuer 12 may issue one or more MASTERCARD, VISA, DISCOVER, DINERS CLUB, JCB, or other suitable credit cards, or any combination of the preceding.

Although credit cards are particularly described, the present invention contemplates credit accounts that do not have associated credit cards. For example, credit card issuer 12 may open a credit account for a customer 14 having an associated credit account identifier but no associated credit card. In particular embodiments, a credit line associated with a credit account may have an associated credit line identifier. Customer 14 may then purchase goods or services on credit using the associated credit account identifier or credit line identifier. Reference to "credit cards" or "credit card accounts" may, where appropriate, encompass such credit accounts. Although purchases are described, the present invention contemplates any suitable transactions, for which payments may be made using credit accounts. For example, a customer 14 may use a credit account to rent one or more items.

Credit card issuer 12 may handle credit accounts, which may involve opening credit accounts for customers 14, monitoring credit accounts, billing customers 14, receiving and handling inquiries and requests from customers 14, evaluating the performance of customers 14, penalizing customers 14 for payment defaults, upgrading credit accounts, and closing credit accounts. In particular embodiments, as described more fully below, opening a credit account for a customer 14 may include establishing one or more lines of credit according to credit information from credit bureau 16 regarding customer 14, information obtained from customer 14 directly, one or more evaluations of payments received from customer 14, or other suitable information, establishing one or more terms of a credit account agreement between credit card issuer 12 and customer 14, and activating one or more services which credit card issuer 12 may provide to customer 14 in connection with the credit account.

Modifications, additions, or omissions may be made to system 10 without departing from the scope of the invention. For example, system 10 may have more, fewer, or other modules. Moreover, the operations of system 10 may be performed by more, fewer, or other modules. Additionally, functions may be performed using any suitable logic comprising software, hardware, other logic, or any suitable combination of the preceding.

Figure 2:
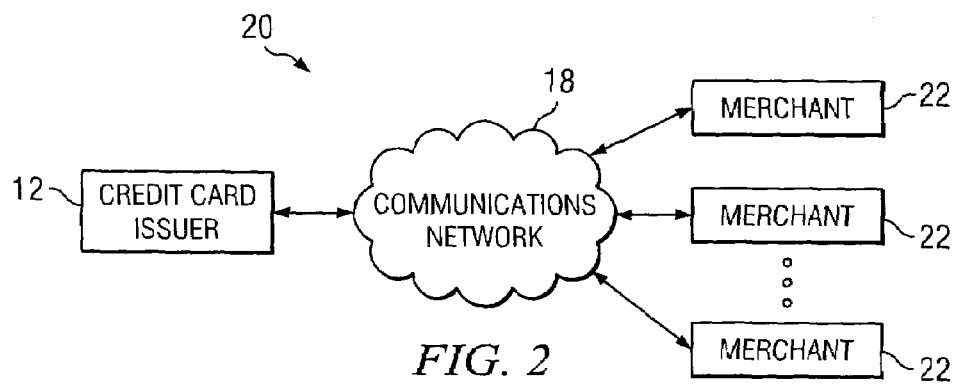
FIG. 2 illustrates an example system for handling transactions in which payments are made using a credit account.

FIG. 2 illustrates an example system 20 for handling transactions for which payments are made using credit accounts. System 20 may include credit card issuer 12 and one or more merchants 22, which may be coupled to each other by communications network 18. A merchant 22 may include any suitable entity that sells goods or services to customers 14, and may include a single entity such as an individual store or a number of entities such as a chain of stores. Merchant 22 may include a seller or distributor that sells goods produced by one or more otherwise unaffiliated producers. In addition or as an alternative, merchant 22 may include a producer that sells one or more goods it produces directly to customers 14, bypassing distributors. Merchant 22 may include one or more outlets at one or more physical locations and may, in addition or as an alternative, include one or more call centers that receive phone orders from customers 14, one or more websites or other virtual locations that receive electronic orders from customers 14, or one or more warehouses that fill orders received from customers 14, or any combination of the preceding.

Communications network 18 supporting communication between credit card issuer 12 and merchant 22 may include, as described above, comprise some or all of a public switched telephone network (PSTN), a public or private data network, the Internet, a wireline or wireless network, a local, regional, or global communications network, an enterprise intranet, other suitable communication link, or any combination of the preceding. Communications network 18 may, where appropriate, include one or more private networks used exclusively for communication between credit card issuer 12 and one or more particular merchants 22. For example, credit card issuer 12 may provide lines of credit to customers 14 to purchase items only at one or more particular merchants 22. Although credit card issuer 12 and merchants 22 are described as separate entities, in particular embodiments, credit card issuer 12 and one or more merchants 22 may be part of a single organization. For example, credit card issuer 12 may include one or more merchants 22, or one or more merchants 22 may include credit card issuer 12.

A customer 14 may purchase goods or services from a merchant 22 in any suitable manner. As an example, customer 14 may purchase goods or services from merchant 22 at a store or other physical location operated by merchant 22. As another example, customer 14 may purchase goods from merchant 22 over the telephone, by mail, or using the Internet or other suitable communications network, which may be similar to communications network 18, and the purchased goods may be subsequently shipped to customer 14.

If customer 14 purchases one or more goods or services from merchant 22, merchant 22 may generate an electronic record of the transaction and communicate the generated record to credit card issuer 12. A transaction record may be generated in any suitable manner, such as at a point-of-sale terminal or other device, and may include any suitable transaction data. For example, a transaction record may include data reflecting an account identifier such as a credit card number, a credit account identifier, a credit line identifier, or other suitable identifier, data reflecting a transaction price, data identifying merchant 22, data reflecting a transaction date, other suitable data, or any combination of the preceding. Credit card issuer 12 may use the communicated transaction record to update the credit account of customer 14 for billing and possibly for other purposes.

Modifications, additions, or omissions may be made to system 20 without departing from the scope of the invention. For example, system 20 may have more, fewer, or other modules. Moreover, the operations of system 20 may be performed by more, fewer, or other modules. Additionally, functions may be performed using any suitable logic comprising software, hardware, other logic, or any suitable combination of the preceding.

Figure 3:
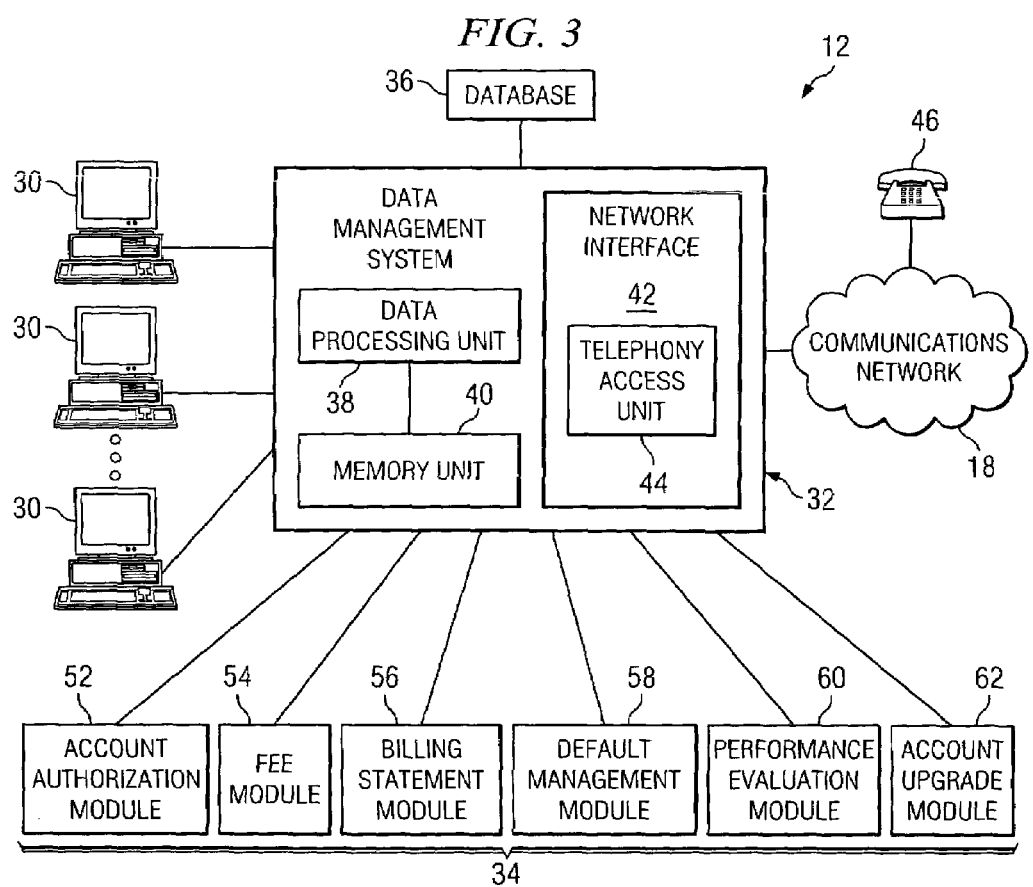
FIG. 3 illustrates an example credit card issuer in accordance with an embodiment of the present invention.

FIG. 3 illustrates an example credit card issuer 12. According to the illustrated embodiment, credit card issuer 12 may include one or more operator terminals 30, a data management system 32, one or more function modules 34, and a database 36. The components of credit card issuer 12 may be located at one or more sites and may be coupled to each other using one or more links, each of which may include, some or all of a computer bus, a public switched telephone network (PSTN), a public or private data network, the Internet, a wireline or wireless network, a local, regional, or global communications network, an enterprise intranet, other suitable communication link, or any combination of the preceding.

An operator terminal 30 may provide an operator access to data management system 32 to configure, manage, or otherwise interact with data management system 32. An operator terminal 30 may include a computer system. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

Data management system 32 may manage data associated with credit accounts, which may in particular embodiments involve creating, modifying, and deleting data files associated with credit accounts automatically or in response to data received from one or more operator terminals 30, function modules 34, or customers 14. Additionally, data management system 32 may call one or more function modules 34 to provide particular functionality according to particular needs, as described more fully below. Data management system 32 may include a data processing unit 38, a memory unit 40, a network interface 42, and any other suitable component for managing data associated with credit accounts. The components of data management system 32 may be supported by one or more computer systems at one or more sites. One or more components of data management system 32 may be separate from other components of data management system 32, and one or more suitable components of data management system 32 may, where appropriate, be incorporated into one or more other suitable components of data management system 32.

Data processing unit 38 may process data associated with credit accounts, which may involve executing coded instructions that may in particular embodiments be associated with one or more function modules 34. Memory unit 40 may be coupled to data processing unit 38, and may comprise one or more suitable memory devices, such as one or more random access memories (RAMs), read-only memories (ROMs), dynamic random access memories (DRAMs), fast cycle random access memories (FCRAMs), static random access memories (SRAMs), field-programmable gate arrays (FPGAs), erasable programmable read-only memories (EPROMs), electrically erasable programmable read-only memories (EEPROMs), microcontrollers, or microprocessors. Network interface 42 may provide an interface between data management system 32 and communications network 18 such that data management system 32 may communicate with customers 14, credit bureaus 16, merchants 22, or any combination of the preceding. According to one embodiment, network interface 42 may comprise a telephony access unit 44 that allows for communication between data management system 32 and a communication device 46. Telephony access unit 44 is described in more detail with reference to FIG. 4.

A function module 34 may provide particular functionality associated with handling credit accounts or handling transactions in which payments are made using credit accounts. As an example only and not by way of limitation, a function module 34 may provide functionality associated with risk profiling, credit account management, billing, or default management. Function module 34 may be called by data management system 32 possibly as a result of data received from an operator terminal 30 or a customer 14 via communications network 18. In response, function module 34 may provide the particular functionality associated with function module 34 in order to communicate one or more results to data processing unit 38 or one or more other suitable components of data management system 32. The communicated results may be used to create, modify, or delete one or more data files associated with one or more credit accounts, provide data to an operator at operator terminal 30 or to customer 14, or perform any other suitable task.

Function modules 34 are operable to perform various functions in the operation of credit account system 10. According to the embodiment shown in FIG. 3, function modules 34 include an account authorization module 52, a fee module 54, a billing statement module 56, a default management module 58, a performance evaluation module 60, and an account upgrade module 62. Like data management system 32, function modules 34 may be physically distributed such that each function module 34 or multiple instances of each function module 34 may be located in a different physical location geographically remote from each other, from data management system 32, or both.

Account authorization module 52 may be operable to provide customers 14 a credit account and to authorize a user for the credit account. According to one embodiment, account authorization module 52 may instruct telephony access module 44 to record an authorized voice signature of an authorized user and to validate voice input from a caller using the authorized voice signature. Fee module 54 may be operable to charge customer 14 fees. Fee module 54 may be operable to charge fees in a variety of ways. For example, fee module 54 may charge a periodic fee, such as a monthly, semi-annual, or annual fee, for providing the credit account.

Billing statement module 56 may be operable to generate billing statements for particular billing periods, provide the billing statements to customers 14, or both. In particular embodiments, billing statement module 56 is operable to generate billing statements that show the minimum payment owed by customer 14 and the due date for the minimum payment. Due dates may be established at any suitable interval of time, for example, monthly, bi-monthly, or weekly. The due dates may be defined according to any suitable manner, for example, according to a certain date of the month such as the first of the month, or according to a certain day of the month, for example, the first Monday of the month.

Default management module 58 may be operable to apply a penalty to customer 14 if customer 14 fails to make a satisfactory payment by the appropriate date, such as a due date, the end of a grace period, or other suitable date. The terms and conditions of a credit account may specify the due dates on which payments are due, and the grace period after the due date during which a payment may be made without incurring a penalty. Performance evaluation module 60 may be operable to evaluate the performance of customer 14 in making payments by the appropriate date. For example, performance evaluation module 60 may be operable to generate, evaluate, or both generate and evaluate statistics regarding the amount and number of payments received from a customer 14, whether such payments are timely or late, whether any penalties have been assessed to the customer 14 by default management module 58, or other suitable statistics. Evaluations generated by performance evaluation module 60 may be used by account upgrade module 62 to make adjustments to one or more aspects of particular credit accounts. For example, in a particular embodiment, account upgrade module 60 may offer an extension to customer 14 if customer fails to make one or more timely payments.

Account upgrade module 62 may be operable to upgrade a credit account in a variety of ways. As an example, account upgrade module 62 may be operable to increase the credit limit associated with a credit account or a credit line of a credit account. As another example, account upgrade module 62 may be operable to replace an installment payment credit line with a revolving credit line or to add a revolving credit line to a credit account having an installment payment credit line.

Modifications, additions, or omissions may be made to credit card issuer 12 without departing from the scope of the invention. For example, credit card issuer 12 may have more, fewer, or other modules. Moreover, the operations of credit card issuer 12 may be performed by more, fewer, or other modules. Additionally, functions may be performed using any suitable logic comprising software, hardware, other logic, or any suitable combination of the preceding.

Figure 4:
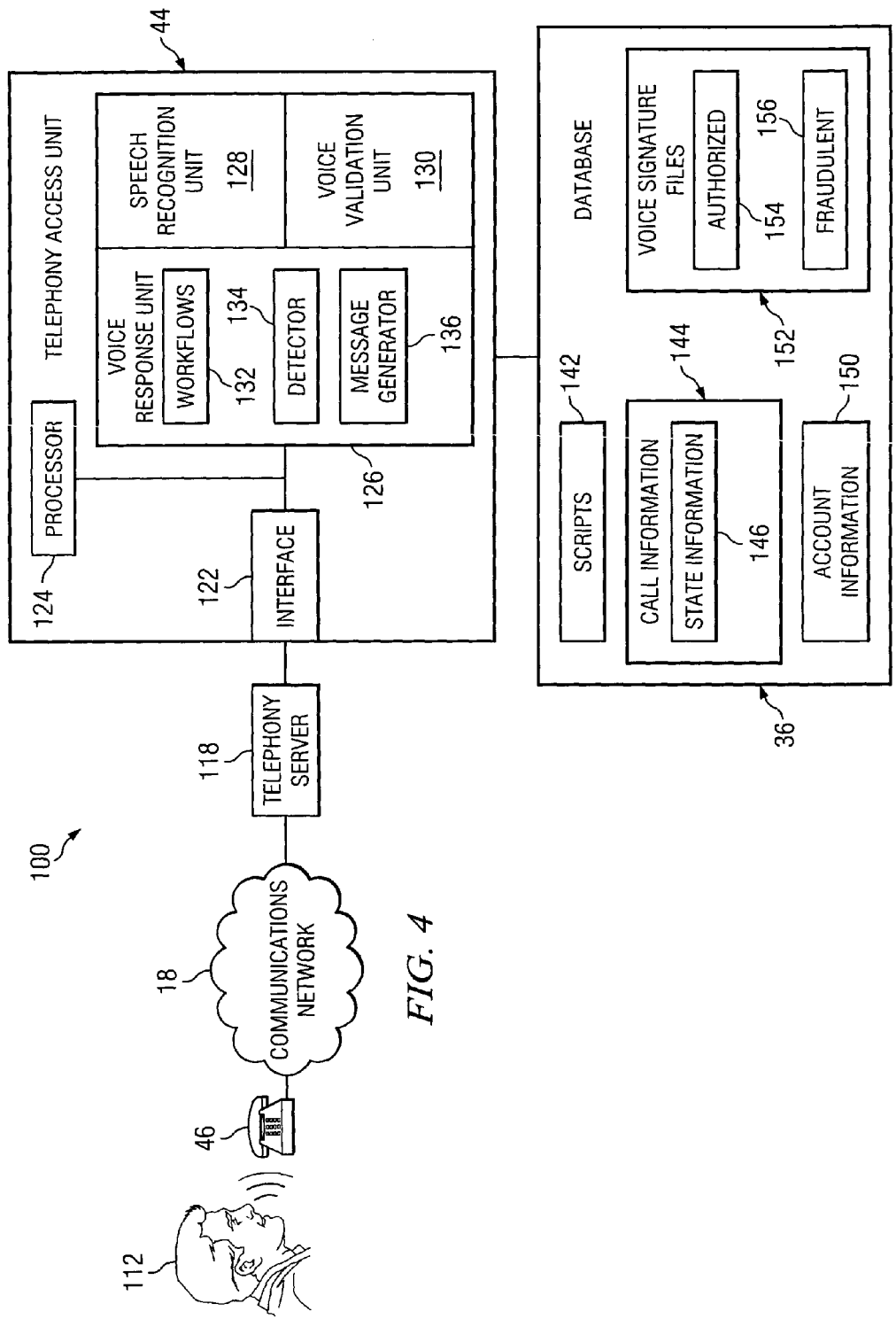
FIG. 4 illustrates an example system that includes a telephony access unit for detecting unauthorized access.

FIG. 4 illustrates an example system 100 that includes a telephony access unit 44 for detecting unauthorized access. Unauthorized access may refer to access or an attempt to access an account by a user other than an authorized user of the account. Telephony access unit 44 may receive a voice input associated with a request to access a credit account, and generate a request voice signature corresponding to the voice input. An authorized voice signature corresponding to the credit account may be retrieved and compared with the request voice signature. Telephony access unit 44 may detect unauthorized access if the request voice signature does not match the authorized voice signature.

According to one embodiment, system 100 includes a communications device 46, communications network 18, a telephony server 118, telephony access unit 44, and database 36 coupled as illustrated in FIG. 4. A caller 112 communicates with telephony access unit 44 using a communications device 46. Communications device 46 may include a telephone, cell phone, or other suitable device that allows caller 112 to communicate with telephony access unit 44. Caller 112 may input information to telephony access unit 44 using voice, touchtones, or other signals generated by communications device 46. According to one embodiment, the input information comprise voice input. Voice input refers to audio signals that represent sound produced by vocal organs, which may be articulated as speech. Voice input may be generated by actual vocal organs or may be generated by a machine to mimic sound produced by vocal organs. Communications network 18 may be as described with reference to FIG. 1. Telephony server 118 allows communications device 46 to access telephony access unit 44. Telephony server 118 may include a communications server, a private branch exchange, an automatic call distributor, a switch, or other system that establishes voice paths or data paths.

Telephony access unit 44 receives a voice input from caller 112 and generates output in response to the input. According to one embodiment, telephony access unit 44 receives a voice input from caller 112 and generates a request voice signature corresponding to the voice input. Telephony access unit 44 compares the request voice signature with an authorized voice signature corresponding to a credit account to determine whether caller 112 has authorized access to the credit account.

According to the illustrated embodiment, telephony access unit 44 includes an interface (IF) 122, a processor 124, a voice response unit 126, a speech recognition unit 128, and a voice validation unit 130. Interface 122 establishes and maintains communication between caller 112 and telephony access unit 44. Interface 122 may include a telephone application programming interface (TAPI). Examples of TAPIs include Java Telephony API and Microsoft/Intel Telephony API. Processor 124 manages the operation of telephony access unit 44. As used in this document, the term "processor" refers to any suitable device operable to accept input, process the input according to predefined rules, and produce output, for example, a personal computer, work station, network computer, wireless telephone, personal digital assistant, one or more microprocessors within these or other devices, or any other suitable processing device.

Voice response unit 126 receives input from caller 112 and outputs responses to caller 112. The responses may comprise voice responses, for example, recorded or generated voice responses. According to the illustrated embodiment, voice response unit 126 includes one or more workflows 132, a detector 134, and a message generator 136 coupled as illustrated in FIG. 4. Workflows 132 describe the operation of telephony access unit 44 in response to input from caller 112. Examples of workflows 132 are described with reference to FIGS. 5 through 7. Detector 134 detects input into voice response unit 126 from caller 112. Message generator 136 generates messages that voice response unit 126 presents to caller 112. Message generator 136 may include a voice synthesizer or a player that plays pre-recorded messages.

Speech recognition unit 128 generates voice signatures from voice inputs. A voice signature describes features of a voice input that are intended to distinguish the voice input from other voice inputs. Accordingly, a voice signature may be used to identify a voice input. As an example, a voice signature may be represented by a feature vector that has values for variables that describe certain features of a voice input signal. For example, a feature vector may comprise a frequency value for a variable that represents the frequency of the signal. Other features may be represented by a frequency vector, for example, the duration and energy level at a given frequency. Fast Fourier transforms, discrete cosine transforms, wavelet techniques, or other suitable technique may be used to determine the feature vector of a voice input.

Voice validation unit 130 compares voice signatures to determine if they match. Matching voice signatures may indicate that the voice signatures correspond to the same voice imprint belonging to the same user. According to one embodiment, voice validation unit 130 compares an input voice signature of a voice input to a stored voice signature to determined if the input voice signature belongs to an authorized user. Voice validation unit 130 may perform voice validation in any suitable manner. For example, voice validation unit 130 may compare an input feature vector for a voice input to a stored feature vector that includes values with variability ranges. If the values of the input feature vector fall within the variability ranges of the stored feature vector, the input feature vector may be determined to correspond to the same voice input of the stored feature vector. Other suitable procedures for performing voice validation, however, may be used.

Database 36 stores data used by telephony access unit 44 and by credit card issuer 12, and may be distributed over any number of computer systems. In a particular example of a telephony access unit 44 used by a financial institution, database 36 may include scripts 142, call information 144, state information 146, account information 150, and voice signature files 152. Database 36 may, however, include any suitable information. Scripts 142 include text for messages to be presented to caller 112. Call information 144 includes information that tracks the processing of individual calls. State information 146 includes information about the state of a call session. Account information 150 includes data that may be requested by caller 112. For example, caller 112 may request information about a credit account.

Voice signature files 152 may include an authorized voice signature file 154 and a fraudulent voice signature file 156. Authorized voice signature file 154 may include voice signatures of authorized users. An authorized voice signature may be associated with a specific account such that a voice input that matches the authorized voice signature can access only the associated account, but not any other account. An authorized voice signature may be generated from voice input of the authorized user in any suitable manner. For example, the authorized user may input the voice input to telephony access unit 44 through communications device 46. As another example, the authorized user may input the voice input through a speech recognition unit that is located separate from telephony access unit 44 such as at the financial institution that is providing the account to the authorized user. The user may be required to provide the voice input in a certain format. For example, the user may be required to say one or more pre-determined words.

Fraudulent voice signature file 156 may include voice signatures of fraudulent users such as users who have attempted to gain unauthorized access to an account. Fraudulent voice signature file 156 may be used for any suitable purpose. For example, fraudulent voice signature file 156 may be used in real time to determine if a caller 112 is attempting to gain unauthorized access. As another example, fraudulent voice signature file 156 may be used to determine if an account is associated with a fraudulent voice signature. Fraudulent voice signature file 156 may be generated in any suitable manner. For example, telephony access unit 44 may add the voice signatures of fraudulent users to fraudulent voice signature file 156. As another example, fraudulent voice signature file 156 may be purchased from a third party that has collected voice signatures of fraudulent users.

Modifications, additions, or omissions may be made to system 100 without departing from the scope of the invention. System 100 contemplates any suitable arrangement to establish communication between communications device 46 and telephony access unit 44. For example, system 100 may have more, fewer, or other modules. Moreover, the operations of system 100 may be performed by more, fewer, or other modules. Additionally, functions may be performed using any suitable logic comprising software, hardware, other logic, or any suitable combination of the preceding.

Figure 5:
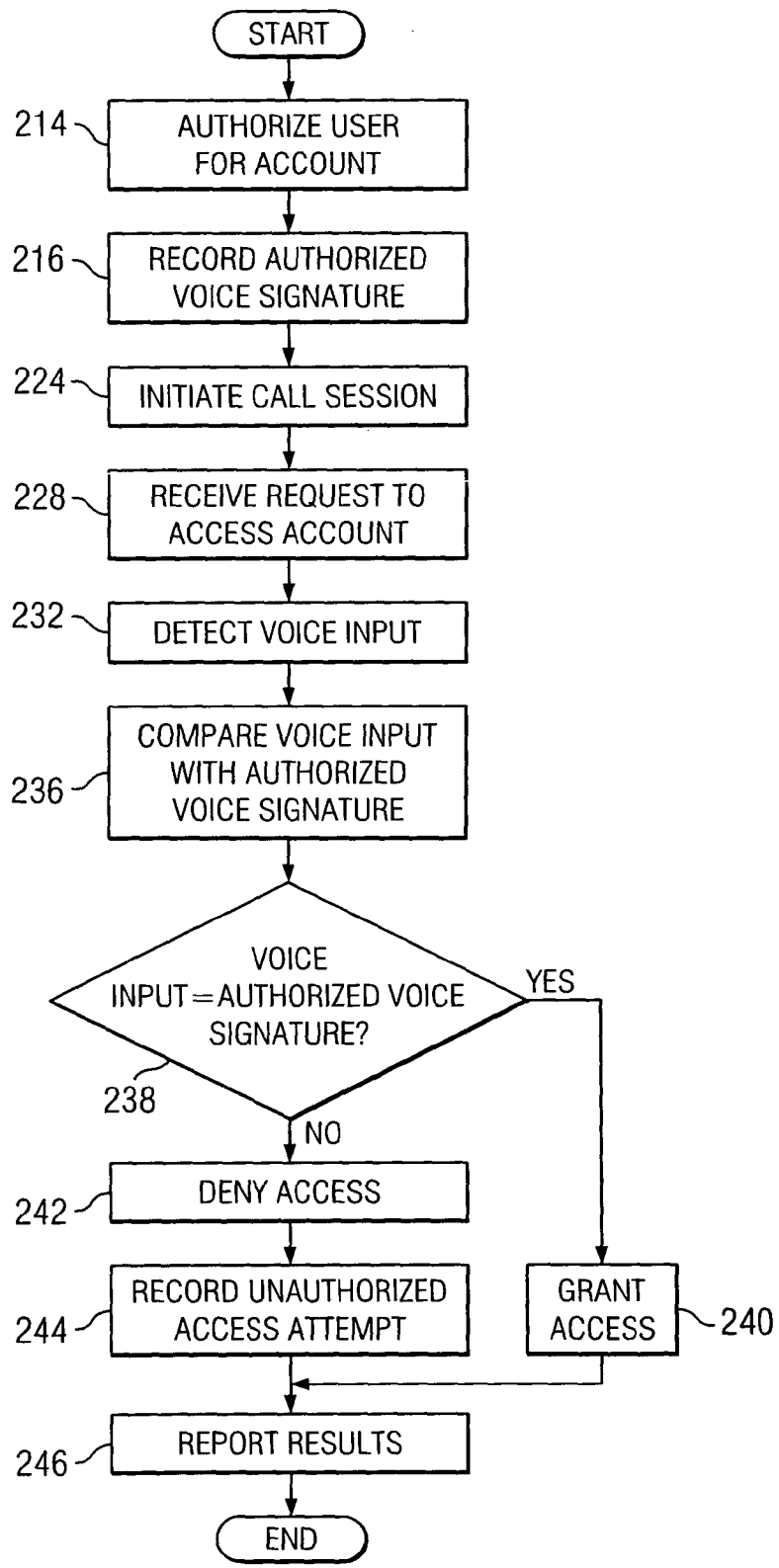
FIG. 5 illustrates an example method for a workflow for detecting unauthorized access to an account.

FIG. 5 illustrates an example method for a workflow 132 for detecting unauthorized access to an account. The method begins at step 214, where account authorization module 52 authorizes a user for an account. The account may comprise, for example, a credit account. An authorized voice signature for the authorized user is recorded at step 216. The authorized voice signature may be recorded in any suitable manner. For example, the authorized voice signature may be generated from voice input received during a call session with user or from voice input from the user in person. Alternatively, the authorized voice signature may be transferred to database 36 from another database.

A call session with a caller 112 using communications device 46 is initiated at step 224. Telephony access unit 44 receives a request from caller 112 to access the account at step 228. Detector 134 at voice response unit 126 detects the voice input of caller 112 at step 232. Telephony access unit 44 compares the voice input of caller 112 with the authorized voice signature at step 236. According to one embodiment, speech recognition unit 128 generates a voice signature corresponding to the voice input. Voice validation unit 130 compares the voice signature with the authorized voice signature. If the voice input matches the authorized voice signature at step 238, the method proceeds to step 240, where caller 112 is granted access to the account. After granting access, the method proceeds to step 246. If the voice input does not match the authorized voice signature at step 238, the method proceeds to step 242, where caller 112 is denied access to the account. Telephony access unit 44 records the unauthorized access attempt at step 244. The method then proceeds to step 246, where the results are reported. The result may describe whether access was granted or denied. After reporting the results, the method terminates.

Modifications, additions, or omissions may be made to the method without departing from the scope of the invention. According to one embodiment, recording the authorized voice signature at step 216 may be omitted. For example, the authorized voice signature may be provided by a third party such that telephony access unit 44 does not need to record the authorized voice signature. Additionally, steps may be performed in any suitable order without departing from the scope of the invention. For example, detecting the voice input of caller 112 at step 232 may be performed prior to receiving the request to access an account at step 228.

Figure 6:
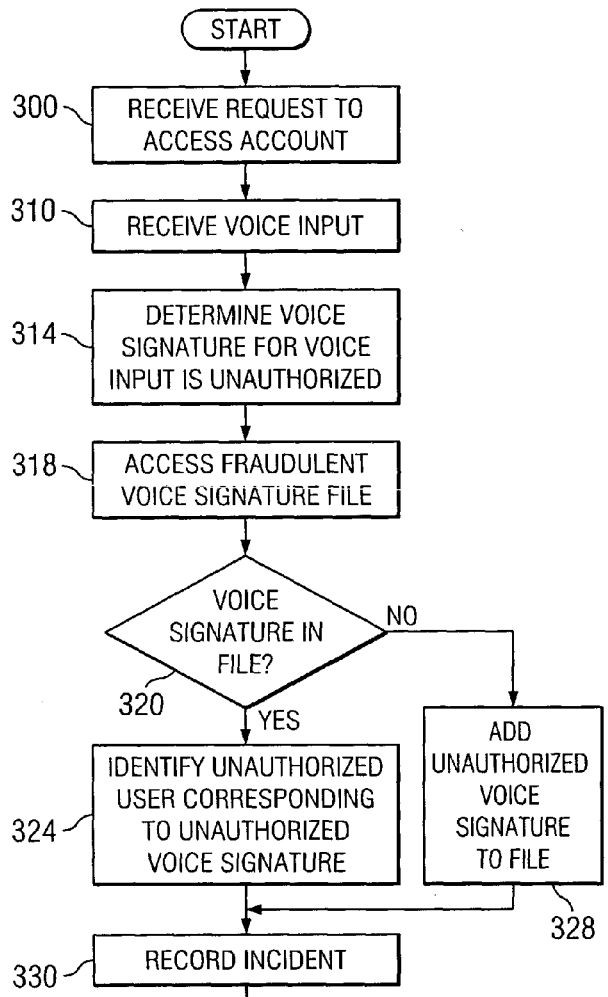
FIG. 6 illustrates an example method for a workflow for generating a fraudulent voice signature file.

FIG. 6 illustrates an example method for a workflow 132 for generating a fraudulent voice signature file 156. The method begins at step 300, where telephony access unit 44 receives from caller 112 a request to access an account. Voice response unit 126 receives voice input from caller 112 at step 310. Telephony access unit 44 determines that the voice input is unauthorized at step 314. According to one embodiment, speech recognition unit 128 generates a voice signature from the voice input, and voice validation unit 130 determines that the voice signature is unauthorized. According to another embodiment, the voice signature may be determined to be unauthorized by establishing in real time that the voice signature matches a fraudulent voice signature of fraudulent voice signature file 156.

Telephony access unit 44 accesses fraudulent voice signature file 156 at step 318. Voice validation unit 130 determines whether the voice signature for the voice input is in fraudulent voice signature file 156 at step 320. If the voice signature is in fraudulent voice signature file 156, the method proceeds to step 324, where the user corresponding to the voice signature is identified. After identifying the user, the method proceeds to step 330. If the voice signature is not in fraudulent voice signature file 156 at step 320, the method proceeds to step 328, where telephony access unit 44 adds the voice signature to fraudulent voice signature file 156. After adding the voice signature, the method proceeds to step 330. The incident that an unauthorized user attempted to access an account is recorded at step 330. After recording the incident, the method terminates.

Modifications, additions, or omissions may be made to the method without departing from the scope of the invention. For example, identifying the user corresponding to the unauthorized voice signature at step 324 or recording the incident at step 330 may be omitted. Additionally, steps may be performed in any suitable order without departing from the scope of the invention.

Figure 7:
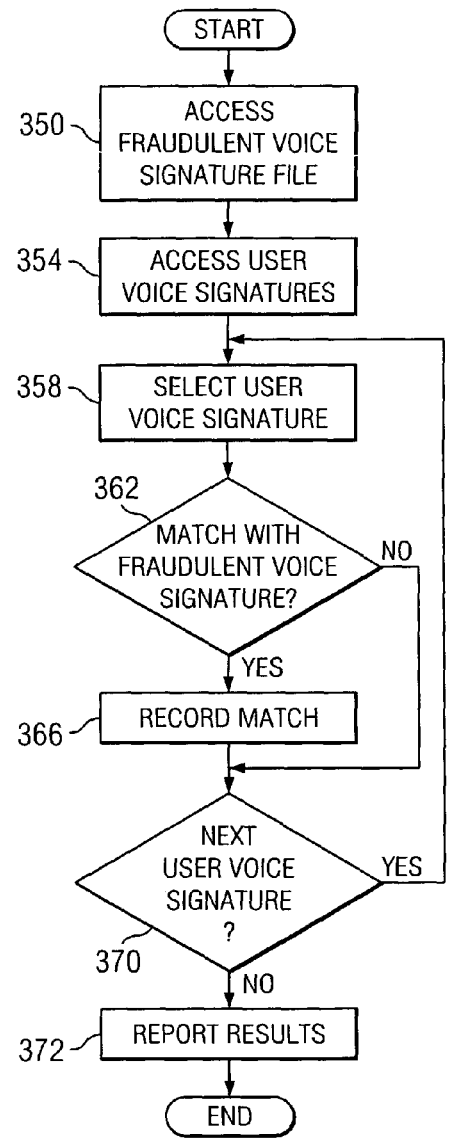
FIG. 7 illustrates an example method for a workflow for identifying fraudulent voice signatures.

FIG. 7 illustrates an example method for a workflow 132 for identifying fraudulent voice signatures. According to one embodiment, the method may be performed by telephony access unit 44. The method, however, may be performed by any device that includes a speech recognition unit 128 and a voice validation unit 130. The method begins at step 350, where fraudulent voice signature file 156 is accessed. User voice signatures of voice signature file 152 are accessed at step 354. A user voice signature may comprise the voice signature of users of a system. A user voice signature is selected at step 358. Voice validation unit 130 determines whether the selected user voice signature matches a fraudulent voice signature of fraudulent voice signature file 156 at step 362.

If the user voice signature matches a fraudulent voice signature, the method proceeds to step 366, where the match is recorded. If the selected voice signature does not match a fraudulent voice signature at step 362, the method proceeds directly to step 370. At step 370, voice validation unit 130 determines whether there is a next user voice signature. If there is a next user voice signature, the method returns to step 358 to select the next user voice signature. If there is no next user voice signature, the method proceeds to step 372, where the results are reported. The results may include, for example, user voice signatures that have been identified as fraudulent. After reporting the results, the method terminates.

Modifications, additions, or omissions may be made to the method without departing from the scope of the invention. For example, a step of recording user voice signatures may be performed prior to accessing the user voice signatures at step 354. Additionally, steps may be performed in any suitable order without departing from the scope of the invention. For example, accessing the user voice signatures at step 354 may be performed prior to accessing fraudulent voice signature file 156 at step 350.

Although an embodiment of the invention and its advantages are described in detail, a person skilled in the art could make various alternations, additions, and omissions without departing from the spirit and scope of the present invention as defined by the appended claims.

What is claimed is:

1. A method for detecting unauthorized access, comprising:
    receiving a voice input associated with a request to access an account;
    generating a request voice signature corresponding to the voice input associated with the request;
    retrieving an authorized voice signature corresponding to the account;
    comparing the request voice signature corresponding to the voice input with the authorized voice signature corresponding to the account;
    determining if the fraudulent voice signature file comprises the request voice signature;
    adding the request voice signature to the fraudulent voice signature file if the fraudulent voice signature file does not comprise the request voice signature;
    detecting unauthorized access in response to the comparison;
    accessing a fraudulent voice signature file; and
    identifying a user associated with the request voice signature in accordance with the fraudulent voice signature file.

2. The method of claim 1, further comprising:
    authorizing a user for the account; and
    generating the authorized voice signature corresponding to the authorized user.

3. The method of claim 1, further comprising:
    authorizing a user for the account;
    receiving an authorized voice input corresponding to the authorized user; and
    generating the authorized voice signature according to the authorized voice input.

4. The method of claim 1, wherein generating the request voice signature corresponding to the voice input associated with the request comprises:
    determining a request feature vector corresponding to the voice input; and
    generating the request voice signature according to the request feature vector.

5. The method of claim 1, wherein comparing the request voice signature corresponding to the voice input with the authorized voice signature corresponding to the account comprises:
    establishing a request feature vector corresponding to the request voice signature, the request feature vector comprising a plurality of first values, each first value corresponding to a variable of a plurality of variables;
    establishing an authorized feature vector corresponding to the authorized voice signature, the authorized feature vector comprising a plurality of second values, each second value corresponding to a variable of the plurality of variables, each second value corresponding to a first value; and
    comparing each first value with the corresponding second value to compare the request voice signature with the authorized voice signature.

6. The method of claim 1, further comprising denying access to the account in response to detecting the unauthorized access.

7. A system for detecting unauthorized access, comprising:
    a database operable to store an authorized voice signature corresponding to an account; and a processor coupled to the database and operable to:
> receive a voice input associated with a request to access the account;
> generate a request voice signature corresponding to the voice input associated with the request;
> retrieve the authorized voice signature corresponding to the account;
> compare the request voice signature corresponding to the voice input with the authorized voice signature corresponding to the account;
> detect unauthorized access in response to the comparison;
> access a fraudulent voice signature file;
> identify a user associated with the request voice signature in accordance with the fraudulent voice signature file;
> determine if the fraudulent voice signature file comprises the request voice signature; and
> add the request voice signature to the fraudulent voice signature file if the fraudulent voice signature file does not comprise the request voice signature.

8. The system of claim 7, the processor further operable to:
> authorize a user for the account; and
> generate the authorized voice signature corresponding to the authorized user.

9. The system of claim 7, the processor further operable to:
> authorize a user for the account;
> receive an authorized voice input corresponding to the authorized user; and
> generate the authorized voice signature according to the authorized voice input.

10. The system of claim 7, the processor further operable to generate the request voice signature corresponding to the voice input associated with the request by:
> determining a request feature vector corresponding to the voice input; and
> generating the request voice signature according to the request feature vector.

11. The system of claim 7, the processor further operable to compare the request voice signature corresponding to the voice input with the authorized voice signature corresponding to the account by:
> establishing a request feature vector corresponding to the request voice signature, the request feature vector comprising a plurality of first values, each first value corresponding to a variable of a plurality of variables;
> establishing an authorized feature vector corresponding to the authorized voice signature, the authorized feature vector comprising a plurality of second values, each second value corresponding to a variable of the plurality of variables, each second value corresponding to a first value; and
> comparing each first value with the corresponding second value to compare the request voice signature with the authorized voice signature.

12. The system of claim 7, the processor further operable to deny access to the account in response to detecting the unauthorized access.

13. A method for detecting unauthorized access, comprising:
> authorizing a user for an account;
> receiving an authorized voice input corresponding to the authorized user;
> generating an authorized voice signature corresponding to the account according to the authorized voice input;
> receiving a voice input associated with a request to access the account;
> generating a request voice signature corresponding to the voice input associated with the request by:
> > determining a request feature vector corresponding to the voice input; and
> > generating the request voice signature according to the request feature vector;
>
> retrieving the authorized voice signature corresponding to the account;
> comparing the request voice signature corresponding to the voice input with the authorized voice signature corresponding to the account by:
> > establishing a request feature vector corresponding to the request voice signature, the request feature vector comprising a plurality of first values, each first value corresponding to a variable of a plurality of variables;
> > establishing an authorized feature vector corresponding to the authorized voice signature, the authorized feature vector comprising a plurality of second values, each second value corresponding to a variable of the plurality of variables, each second value corresponding to a first value; and
> > comparing each first value with the corresponding second value to compare the request voice signature with the authorized voice signature;
>
> detecting unauthorized access in response to the comparison;
> denying access to the account in response to detecting the unauthorized access;
> accessing a fraudulent voice signature file comprising a plurality of fraudulent voice signatures;
> determining if the fraudulent voice signature file comprises the request voice signature;
> adding the request voice signature to the fraudulent voice signature file if the fraudulent voice signature file does not comprise the request voice signature;
> identifying a user associated with the request voice signature in accordance with the fraudulent voice signature file;
> receiving a user voice signature;
> comparing the user voice signature to at least a portion of the plurality of fraudulent voice signatures;
> determining whether the user voice signature matches a fraudulent voice signature; and
> identifying the user voice signature as fraudulent if the user voice signature matches a fraudulent voice signature.

* * * * *